US010372799B2

(12) United States Patent
Roks

(10) Patent No.: US 10,372,799 B2
(45) Date of Patent: Aug. 6, 2019

(54) SYSTEM AND METHOD FOR REDACTING CONTENT

(71) Applicant: Veritone, Inc., Costa Mesa, CA (US)

(72) Inventor: Christopher Roks, Tustin, CA (US)

(73) Assignee: Veritone, Inc., Costa Mesa, CA (US)

( * ) Notice: Subject to any disclaimer, the term of this patent is extended or adjusted under 35 U.S.C. 154(b) by 0 days.

(21) Appl. No.: 15/665,630

(22) Filed: Aug. 1, 2017

(65) Prior Publication Data

US 2018/0322106 A1 Nov. 8, 2018

Related U.S. Application Data

(60) Provisional application No. 62/500,939, filed on May 3, 2017.

(51) Int. Cl.

| | |
|---|---|
| ***G06F 17/00*** | (2019.01) |
| ***G06F 17/24*** | (2006.01) |
| ***G06F 3/0484*** | (2013.01) |
| ***G06F 17/27*** | (2006.01) |
| ***H04L 29/08*** | (2006.01) |
| ***G06F 21/62*** | (2013.01) |

(52) U.S. Cl.

CPC .......... *G06F 17/24* (2013.01); *G06F 3/04842* (2013.01); *G06F 17/2775* (2013.01); *G06F 17/2785* (2013.01); *G06F 21/6245* (2013.01); *H04L 67/06* (2013.01)

(58) Field of Classification Search

CPC ................................ G06F 17/24; G06F 17/21

See application file for complete search history.

(56) References Cited

U.S. PATENT DOCUMENTS

| | | | | |
|---|---|---|---|---|
| 2007/0030528 | A1 * | 2/2007 | Quaeler | G06F 17/24 358/453 |
| 2008/0118150 | A1 * | 5/2008 | Balakrishnan | G06F 17/2276 382/176 |
| 2008/0243825 | A1 * | 10/2008 | Staddon | G06F 17/30637 |
| 2012/0239380 | A1 * | 9/2012 | Cumby | G06F 17/2785 704/9 |

OTHER PUBLICATIONS

WO, PCT/US18/30740 ISR and Written Opinion, dated Jun. 8, 2018.

* cited by examiner

*Primary Examiner* — Andrew T McIntosh

(74) *Attorney, Agent, or Firm* — One LLP; Joseph K. Liu

(57) ABSTRACT

Systems and methods for transcribing and redacting a media is provided. One of the systems comprises: a transcription module configured to: receive the media content; transcribe the media content to create a transcript; a correlation module to correlate one or more words in the transcript to a start and end points in the media content; and a redaction module configured to: receive one or more candidate words to be redacted; and matching the received one or more candidate words to the one or more words in the transcript and identifying start and end points in the media; and redact one or more portions of the media content using the identified start and end points.

13 Claims, 9 Drawing Sheets

SYSTEM AND METHOD FOR REDACTING CONTENT

CROSS-REFERENCE TO RELATED APPLICATION

This application claims priority to U.S. Provisional Application No. 62/500,939 entitled "SYSTEM AND METHOD FOR REDACTING CONTENT", filed May 3, 2017, which application is hereby incorporated in its entirety by reference.

FIELD

Various aspects of the disclosure relate to content redaction, and in one aspect, but not by way of limitation, to redaction of media and/or multimedia content using time correlated data.

BACKGROUND

The volume of information, particularly, audio and video content is growing exponentially. Today, it is common to have several hundreds or even thousands of hours of audio and/or video content being subjected to discovery requests. However, before a company/firm makes the requested media content (e.g., audio, video content) available, someone will have to sift through every second of the audio and/or video content to look for privileged/confidential information for redaction. As a result, this process can be very time intensive and expensive. Accordingly, what is needed is a novel and improved way for conducting redaction of media content.

SUMMARY

Example embodiments of a system and method for transcribing and redacting a media or content are disclosed, as are example embodiments of components of the system and methods of using the system and/or components thereof. Certain embodiments of the method for transcribing and redacting content can include: transcribing at a server one or more media files to create one or more transcripts; determining a start and end points in the one or more media files for one or more words in the one or more transcripts; receiving one or more candidate words to be redacted; and redacting one or more portions of the one or more media files containing the received one or more candidate words.

The method for transcribing and redacting content also includes: receiving the one or more media files at the server; sending the one or more transcripts to a client device for display; displaying a portion of the one or more transcripts on the client device; enabling a user to select, on a user interface of the client device, one or more words of the displayed portion of the one or more transcript; and receiving, at the server, the highlighted one or more words from the client device.

In some embodiments, on the client device side, the client device can display on a user interface one or more time bars for the one or more media files. Each media can have its own time bar. The client device can visually indicate on the displayed one or more time bars one or more redacted portions of the one or more media files. In this way, the user can quickly tell where in the media playback timeline the redacted portions are located.

The method for transcribing and redacting content further includes: determining one or more equivalent words that have similar meaning to each word in the selected group of words; identifying each occurrence of the determined one or more equivalent words in the transcript; and redacting one or more portions of the media containing the one or more equivalent words using the correlated start and end points of the similar words. In this way, when a user selects the name "Bob" for redaction, the method and system can also suggest and can automatically redact equivalent names such as Bobby, Bobbie, Rob, and Robert.

In some embodiments, the user can select or unselect any of the suggested names for redaction (or to remove it from the redaction list). Accordingly, the method for transcribing and redacting content further includes: sending, to a client device, the determined one or more equivalent words for display the user interface of the client device; receiving a selection of one or more equivalent words to include in the redaction; and redacting one or more portions of the media based on the received selection of one or more equivalent words.

Other systems, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

Overview

One of the most common forms of redaction is document redaction (e.g., emails, memo, lab notes, etc.). The redaction of various documents can be done manually or by using electronic redaction software with optical character recognition (OCR) capability. The manual redaction process is time consuming and error prone and current electronic document redaction technologies are limited to scanned documents using OCR. Currently, there is no available means to automatically conduct redaction of electronic media such as unscripted audio and video content. Today, there is only one way to redact electronic media containing unscripted audio and/or video data. It is done manually—a content reviewer will have to listen and/or watch every second of the audio or video content to look for privileged information for redaction. This obviously is a very expensive and labor intensive process. Accordingly, there is a need for a system and method to conduct redaction of electronic media such as unscripted audio and/or video files in an accurate and efficient manner.

Figure 1:
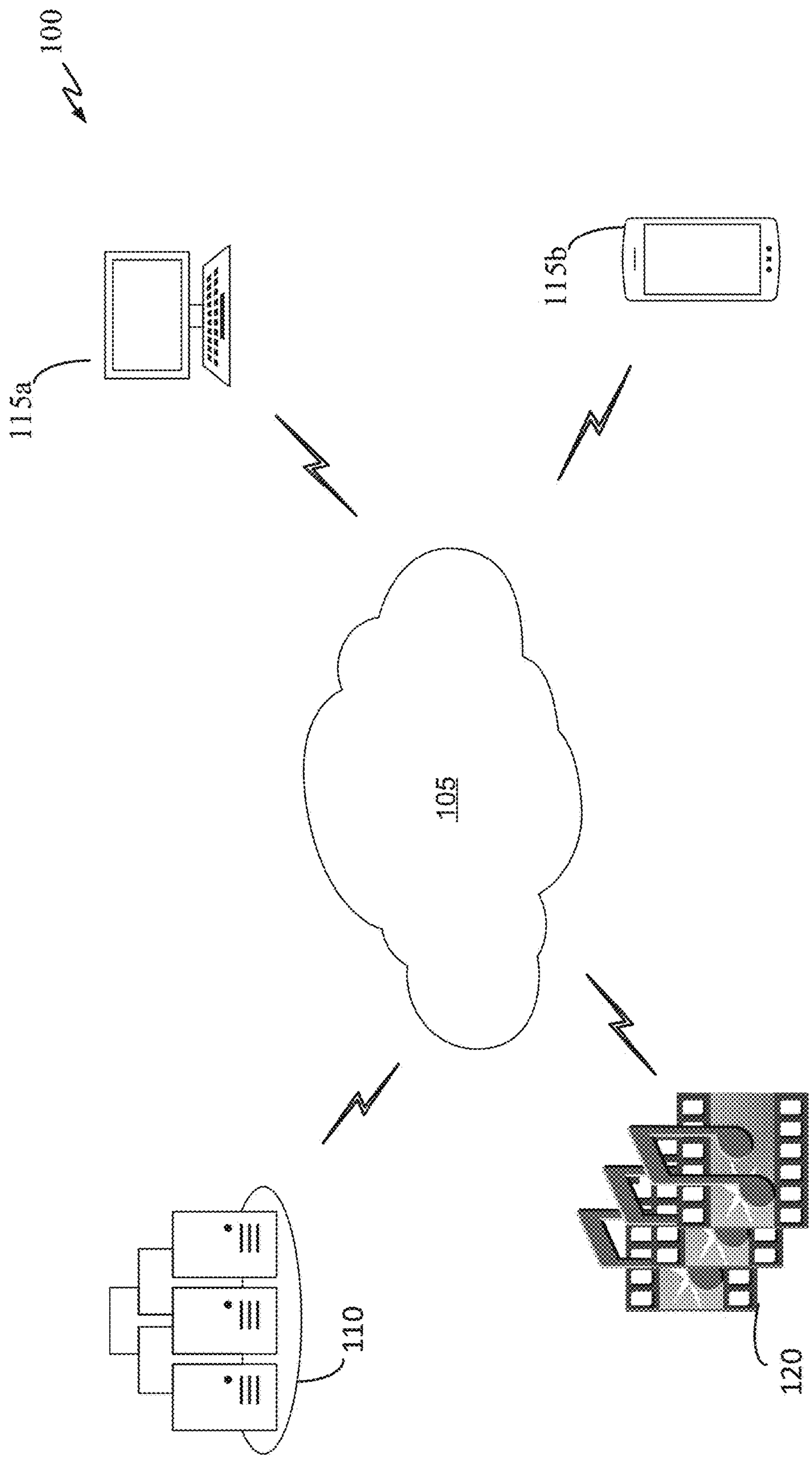
FIG. 1 illustrates an exemplary environment in which the transcription and redaction system operates in accordance with an aspect of the disclosure.

FIG. 1 illustrates an exemplary redaction system 100 in accordance with some embodiments of the present disclosure. System 100 includes a transcription-redaction server 110, client devices 115*a* and 115*b*, and media content 120 (e.g., unscripted audio files, video files, multimedia files). Transcription-redaction server 110 can include one or more servers. Each server 110 can include a transcription module (see item 805 of FIG. 8) configured to transcribe media content 120 and to produce a transcript for media content 120, which can be a collection of media file including audio, video, and other forms of multimedia.

Each server 110 can also include a text-to-content-location correlation module (see item 810 of FIG. 8) to correlate each text or word in the transcript to the exact starting and ending points/location on the media. For example, the correlation module can be configured to find all instances of the word "drug" on the transcript and to correlate the starting and ending locations (e.g., starting location: 5 min 45 sec into the media content; ending location: 5 min 46 sec) on the media to each instance of the word "drug". In this way, the transcription and correlation modules can determine the exact starting and ending points/locations of each word in the transcript. In some embodiments, the functionalities of transcription and correlation modules can be combined into a single transcription-correlation module. Additionally, the transcription and correlation processes can be performed simultaneously and/or independently of each other.

Once the transcription and correlation processes are completed by the transcription and correlation modules (or a combination of both modules), the transcript can be sent to client device 115*a* or 115*b* for display. In some embodiments, each of the client devices 115 can display a portion of the transcript and allow the user to select one or more candidate words/texts of the transcript for redaction. The user may scroll to other portions of the transcript and select any text/word in the transcript for redaction. Because each word in the transcript is time correlated to a start and end points on the media, the user selection of the one or more candidate words can be identified and pinpointed to the exact start and stop locations or time frame(s) on the media.

A redaction module (see item 820 of FIG. 8), which can be a part of server 110, can be configured to redact, replace, erase, and/or edit one or more portions of the media containing words/text that matches with the user selected candidate words. In some embodiments, the redaction module finds all instances of the selected one or more candidate words in the transcript and then identify the corresponding portions of the media using the correlated start and stop locations for words that matches with the candidate words. Once all start and stop time locations (for all candidate words) are identified, the redaction module can redact portions of the media that correspond to the plurality of start and stop time locations.

The redaction module, working in conjunction with the client device, can also display a time bar for the media on the client device. The time bar is representative of the duration of the media playback. In some embodiments, the redaction module can provide visually indications on the various portions of the time bar of the media to indicate that the corresponding portions have been redacted and/or replaced. For example, portions on the time bar that correspond to redacted portions of the media can have a different shade of color or pattern. In this way, the user can immediate identify the redacted portions of the media and may advance to the redacted portions during playback to confirm whether the content has been properly redacted and/or replaced.

In some embodiments, playback of the media can be displayed on a portion of the display of the client device. Simultaneously, a portion of the transcript of the media can be displayed in another portion of the display. As previously indicated, the user interface of the client device is configured to allow the user to scroll through the transcript. In some embodiments, the user can select any portion of the transcript and the playback display portion of the media will automatically advance to the selected position in the transcript. The user can also select one or more candidate words in the transcript for automatic redaction. Once the selection of candidate words is completed, the user can initiate the media redaction process. At this point, each word in the transcript is already time correlated to a start and end locations (points or timeframes) in the media. Accordingly, the exact start and stop locations (in the media) of all the candidate words can be determined, which will then be used by the redaction module to redact, erase, blank out, or replace the media portions corresponding to the determined (plurality of) start and stop locations.

Redaction User Interface

Figure 2:
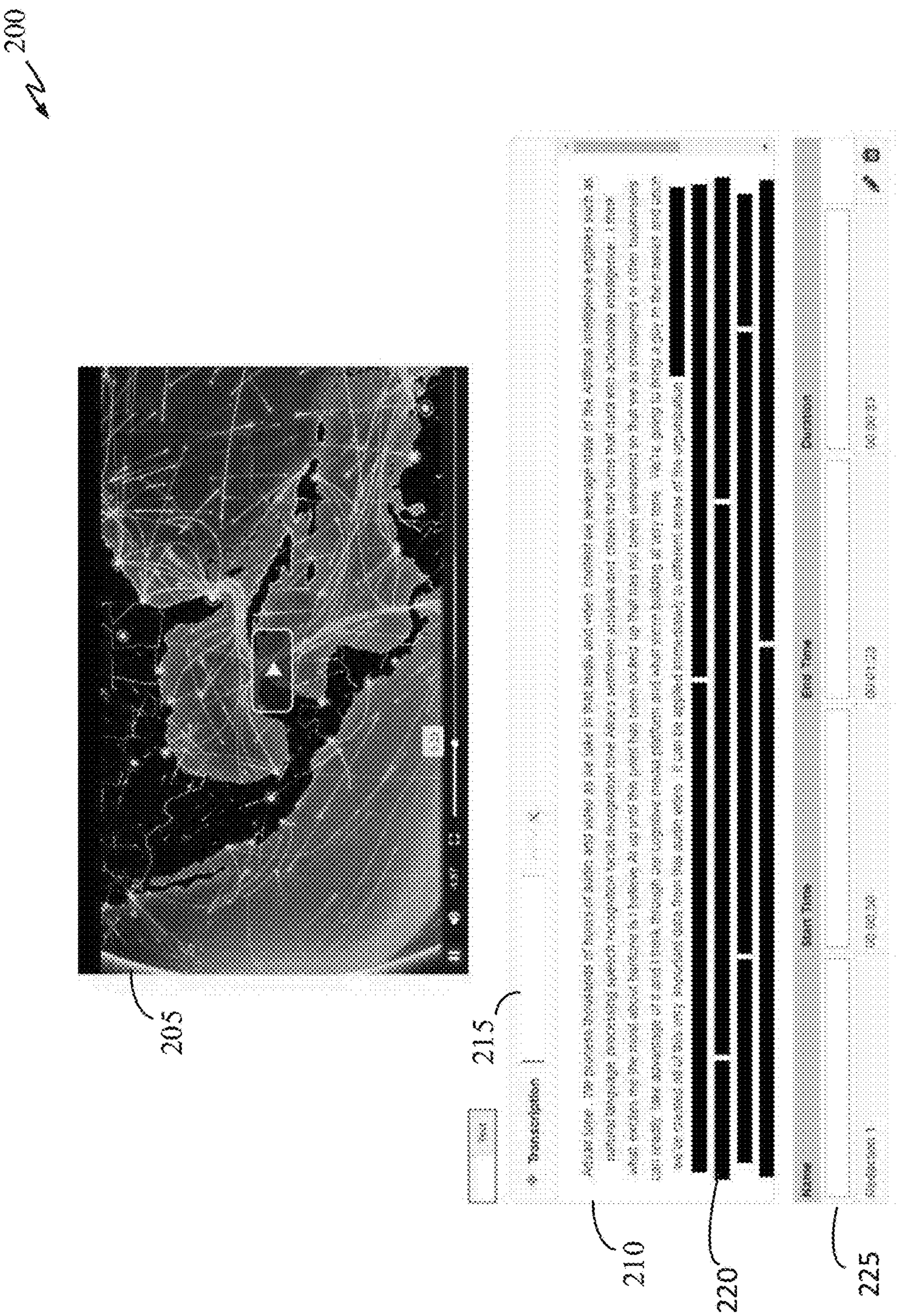
FIGS. 2-3 are example user interfaces in accordance with some aspects of the disclosure.

FIG. 2 illustrates a redaction user interface 200 designed to facilitate the redaction process in accordance with some embodiments of the present disclosure. User interface 200 includes a media display area 205, a transcript display area 210, and a search box 215. Media display area 205 provides a playback area to allow the user to review the media content. Media display area 205 and transcript display area 210 are temporally (time) linked. In other words, as media display area 205 playbacks the content, transcript display area 210 automatically displays and scrolls to the portion of the transcript that corresponds to the playback portion of the media.

Search box 215 enables the user to quickly search for any word in the transcript. The user may enter one or more words into search box and the search results will be displayed (and/or highlighted) in transcript display area 210.

In some embodiments, transcript display area 210 can allow the user to select one or more words (continuously or non-continuously) of the transcript for redaction. The selected portion or portions may be visually indicated using highlight or blackened as shown as item 220 on FIG. 2.

The user can also archive a redaction procedure using an archiving interface 225. An archived redaction procedure can be recalled for edit, deletion, or cancellation (restoration). For example, the user may redact all portions of the media where "Jane Doe" is mentioned. However, circumstances may change and the statements (information) made with respect to or in reference to Jane Doe may no longer be privileged. Accordingly, archiving interface 225 can provide a way for the user to retrieve archived redaction procedures for editing and/or cancellation. In this example, the user may recall and restore all of the redactions made with respect to Jane Doe.

In some embodiments, when a portion of a media is redacted, the redaction is permanent with respect to that media. However, a full and un-redacted copy of the redacted media can be separately stored in an archival database (see item 825 of FIG. 8) to enable recovery of the redacted portion. Thus, in order to cancel a redaction and to "unredact" a portion of the media, the redaction module can access the unredacted copy to obtain a corresponding unredacted portion. The redaction module may then replace the redacted portion with the corresponding unredacted portion from the archive to restore the media to the state prior to the redaction event.

In some embodiments, each time a portion of a media is redacted, the copy of the portion of the media (to be redacted) is made and stored. The copied portion is stored along with the redaction information such as the word and/or phrase being redacted, the starting and ending positions (locations, points) in the media, the name and ID of the media, and any other information necessary for later retrieval. In this way, in a scenario where one or more redacted portions need to be restored, the redaction module (or system 100) can quickly retrieve the corresponding unredacted portion. The unredacted portion may be spliced into the redacted media to replace and restore the redacted portion.

Figure 3:
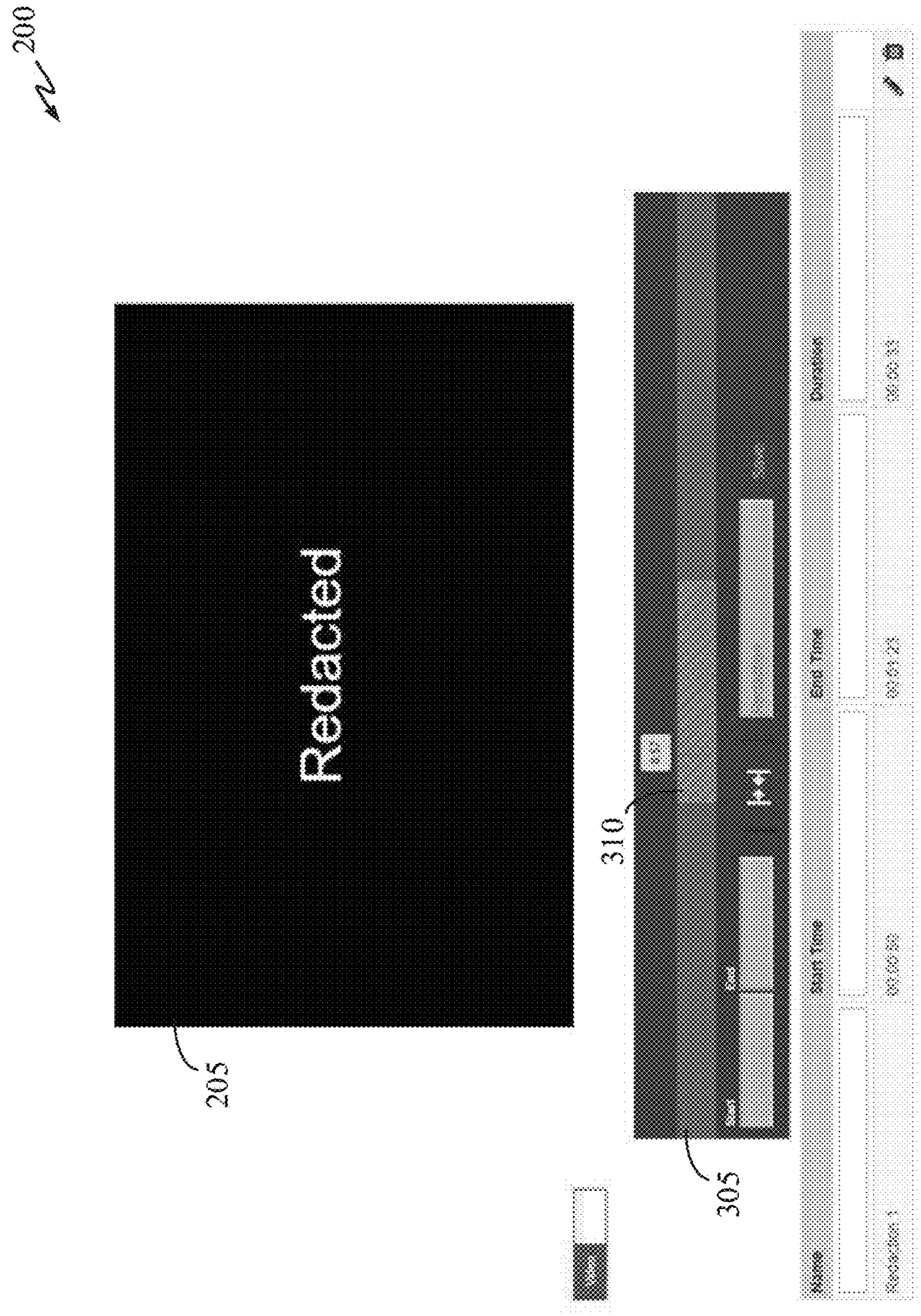

FIG. 3 illustrates redaction user interface 200 during the playback of a redacted portion of a media in accordance with some embodiments of the present disclosure. As shown, user interface 200 includes a time bar 305 that represents a portion or the entire duration of the media. User interface 200 also includes shaded time bar portion 310 to visually indicate the location of a redacted portion within the playback timeline 305 of the media. For example, the media may be 60 minutes long (which may be represented by the length of the time bar) and the shaded area (e.g., area 310) may start at 25 mins and ends at 40 mins. In this way, the user may quickly identify the locations of redacted portions and advance to any of the redacted positions for further inspection.

Redaction Algorithms

The redaction algorithms, systems, and methods described herein provide a much more accurate and faster way of redacting media content than traditional manual process. In fact, it would not be possible to achieve the level of accuracy and efficiency provided by the disclosed redaction algorithms, systems, and methods using the traditional manual redaction process. The traditional/conventional redaction process is purely manual where a user is required to watch and/or listen to every second of a media for one or more candidate words (words to be redacted). Once the user hears a candidate word, the user will have to manually edit the media in the exact position the user heard the candidate word. This manual process is very prone to human errors and inefficient as it lacks any rules and procedures provided by the currently disclosed redaction algorithms/systems—rules and procedures such as: recognizing candidate words in the media using transcription; accounting for tonal and accent differences from different people and/or regions to accurately identify candidate words; flagging questionable candidate words identification; time correlating each word in the transcript to a start and stop locations (positions, points, or time frame); enabling the user to select candidate words for redaction; enabling the user to review flagged candidate words; identifying similar words or words having the same meaning and/or implication to each candidate word; identifying portions of the media and their start and stop locations that contain the candidate and/or identified similar words; enabling the user to accept, edit, add similar words for redaction; storing unredacted portion of each identified portions; redacting the identified portions of the media; enabling the user to edit, cancel, and/or restore any redacted portion using the stored unredacted portions. Accordingly, the new and improved redaction algorithms, systems, and methods provide a superior way (i.e., more efficient, faster, and more accurate) to perform redaction of media content such as unscripted audio, video, or other forms of multimedia that would otherwise not be possible (or exceedingly difficult) using conventional redaction method.

Figure 4:
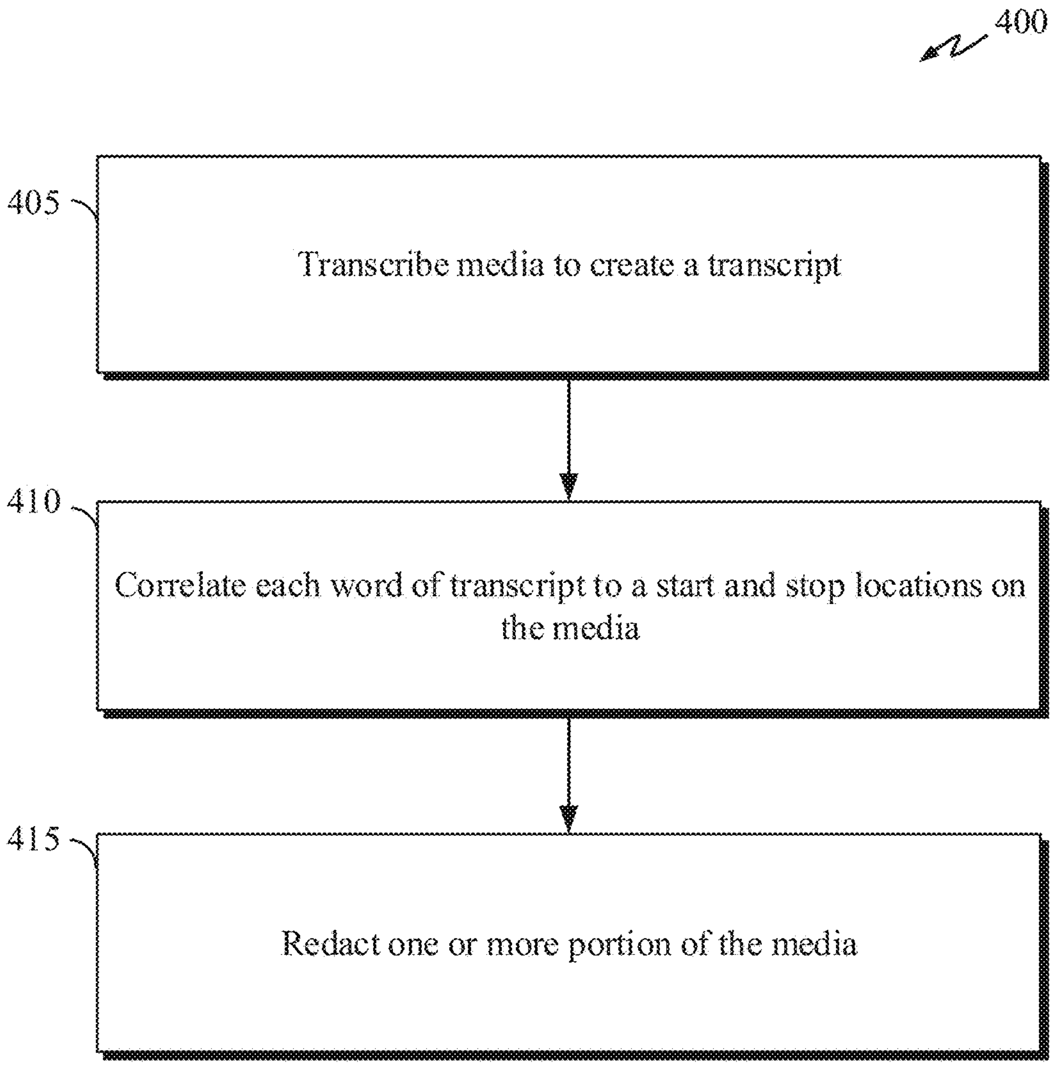
FIGS. 4-7 are block diagrams of the transcription and redaction processes in accordance with some aspects of the disclosure.

FIG. 4 is a block diagram of a redaction method/process 400 in accordance with some embodiments of the present disclosure. Method 400 starts at 405 where an unscripted media file and/or stream is received by a transcription module, which may reside on server 110 or on client device 115*a*. Once the media file and/or stream is received, the transcription module can transcribe a portion or the entire length of the media. The transcription module can also produce a transcript of the media, which can be displayed on a client device. The unscripted media can be an unscripted audio and/or video content such as audio/video records of board meetings, psychiatry sessions, counseling sessions, police videos, security videos (and/or audio), mobile phone generated multimedia, customer service recordings, and other recorded unscripted conversations and events. Unscripted media can also include live broadcasts. It should be noted that there is a pronounced distinction between unscripted audio and video with scripted TV shows, movies, plays, etc., which are mostly (if not entirely) previously scripted content. A scripted media has clear pre-written dialog and are typically developed for the public view. An unscripted media is entirely different in that it is unscripted, unpredictable, and contains many variables that can change the dynamic, tone, and outcome of the conversation and/or event. These variables present a challenge for transcribing unscripted media. Some of these variables are, but not limited to, tonal differences of spoken words, accent, quality of the audio/video, use of slang, use of nickname, etc.

Another important distinction between scripted and unscripted media is the location of words/texts in the media playback timeline. In scripted media, the dialog is prewritten and the location a word in the dialog is generally known such as, for example, chapter 1: act 2, scene 3, etc. This means it is very easy to search for word, in scripted content, and to determine where in the media the word appears (or spoken). For unscripted media, there is no control of what might be said, how something is said, when something is said, and who is speaking, etc. Accordingly, for unscripted media, the transcript generated by the transcription module is time correlated to the media playback timeline using a correlation module configured to correlate each word to the start and end locations (points, timeframe) of the media during playback.

At 410, a correlation module time correlates each word in the transcript to a start and stop locations in the media. In some embodiments, at least 1 or 2 seconds are subtracted from the start location (to make the start location/time earlier) and added to the stop location (to make the stop location/time later). In this way, the candidate word being targeted for redaction has a greater chance of being fully redacted and to avoid accidental inclusion of the redacted word in the final redacted product/media. Although the transcription and correlation modules are described as separate and independent modules, the functionalities of transcription and correlation modules can be integrated into a single transcription-correlation module. The combined module may reside on the server and/or the client.

At 415, a redaction module can redact one or more portions of the media containing a user selected/defined word and/or phrases (e.g., candidate words). The redaction process can include: deleting the entire portion having the candidate word (hereinafter referred to as "candidate portion"); replacing the candidate portion with a blank audio/video portion; and replacing the candidate portion with a redaction message. In some embodiments, portions of the media to be redacted are copied and archived prior to being redacted. In this way, if any redacted portions need to be restored (unredacted), system 100 can retrieve corresponding unredacted copies of the redacted portions and restore them based on each of the redacted portion identifying information and start and stop locations within the media.

In some embodiments, the redaction module can also assign a confidence score to each word and/or phrase being redacted. The confidence score can have a number range, for example, such as 1 to 10—10 being very confident and 1 being not very confident. The redaction module can be set to flag any word and/or phrase being redacted having a confidence score lower than 5 for further review. The user can also set the aggressiveness factor of the redaction system. For example, in a high aggressive redaction setting, any words with confidence scores of 4 or higher will be redacted. Similarly, in a low aggressive redaction setting, only words having confidence scores of 7 or higher will be redacted. In some embodiments, words having confidence scores lower than the redaction threshold can be highlighted/flagged for further review.

Figure 5:
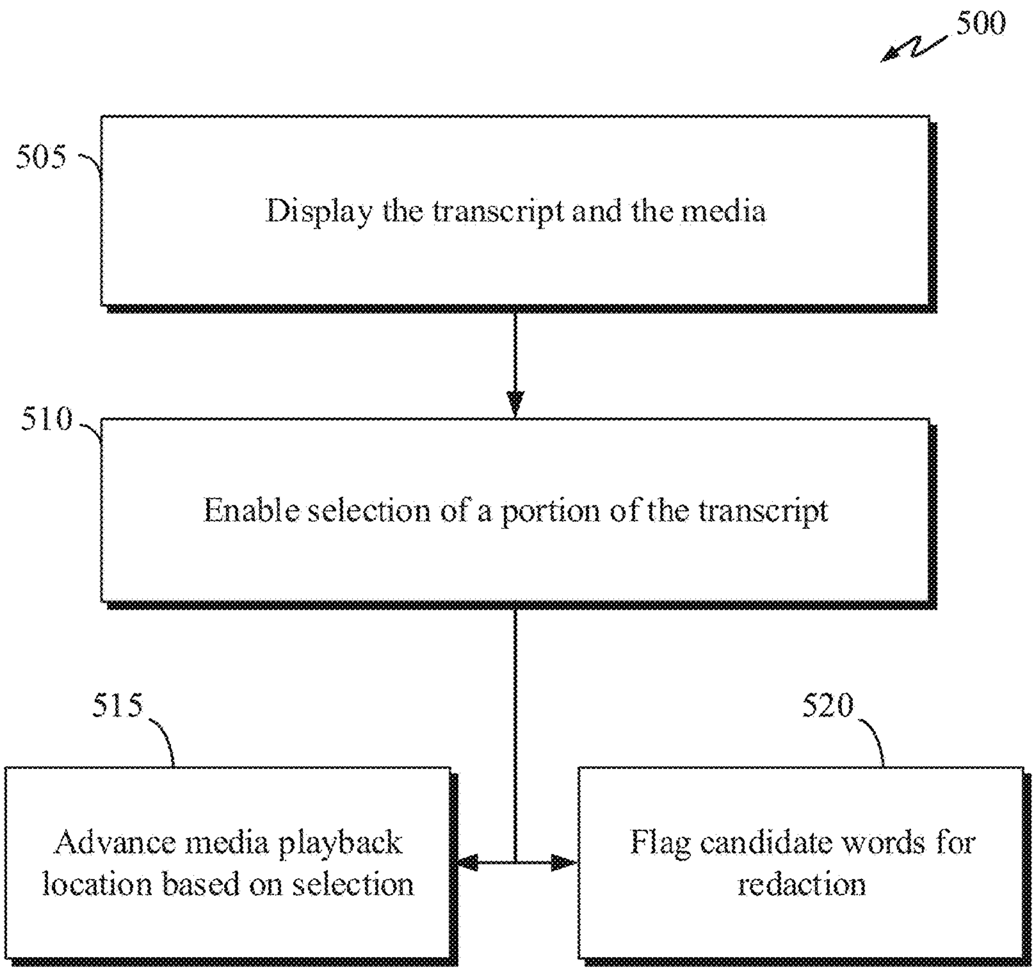

FIG. 5 is a block diagram of a display and navigation method 500 in accordance with some embodiments of the present disclosure. At 505, a client device (e.g., client device 115) displays the transcript and the media on a display of the client device. The transcript and the media may be sent to the client device from a remote transcription server (e.g., server 110). In some embodiments, the media and the transcript may be displayed concurrently in different areas of the display such as display areas 205 and 210. As previously indicated, display area or area 210 is configured to allow the user to select a text/word (at 510). Display area 210 also allows the user to select one or more words (a phrase) as candidate words, continuously or non-continuously (i.e., by holding down the control key, the user can select non-continuous words/phrases). After a word (or group of words) is selected, display area 210 enable two primary functions. First, the user can advance the media playback to a particular location of the playback timeline that corresponds with the selected word of the transcript (at 515). This can be done by double-clicking on a word or selecting a advance-to-transcript button (not shown) to cause display area 205 to advance the media to the location of the selected transcript. The second primary function is redaction. The selected words are treated as candidate words. The user may select the candidate words in display area 210 by highlighting the words or by clicking on a word to select and/or un-select it. Once the candidate words (and/or phrases) are selected, the candidate words are flagged for redaction at 520 (using a redaction button, not shown). Flagging the candidate words can include sending the candidate words to the redaction server for redaction or redacting the flagged candidate words locally, depending on where the redaction module resides. As previously indicated, redaction of a candidate word can include deleting or substituting the portion of the media to which the candidate word is time correlated. In some embodiments, the portion of the media to which the candidate word is time correlated (also referred to as the candidate portion) is substituted with a blank portion or a portion having a message to indicate that the candidate portion is redacted.

The process at 520 can also include visually indicating on playback time bar 305 redacted portions of the media (e.g., portion 310). Although only one redacted portion 310 is shown on time bar 305, many redacted portions 310 can be scattered along time bar 305 with each redacted portion corresponding to a candidate word and/or candidate portion found in the transcript. The location of the redacted portion on time bar 305 directly corresponds to the time stamp (e.g. start and stop locations) of each candidate word as it occurs in the media. As shown in FIG. 3, redacted portion 310 spans several seconds. This indicates that redaction portion 310 corresponds to a plurality of candidate words and/or phrases that spans several seconds or minutes in the media.

Figure 6:
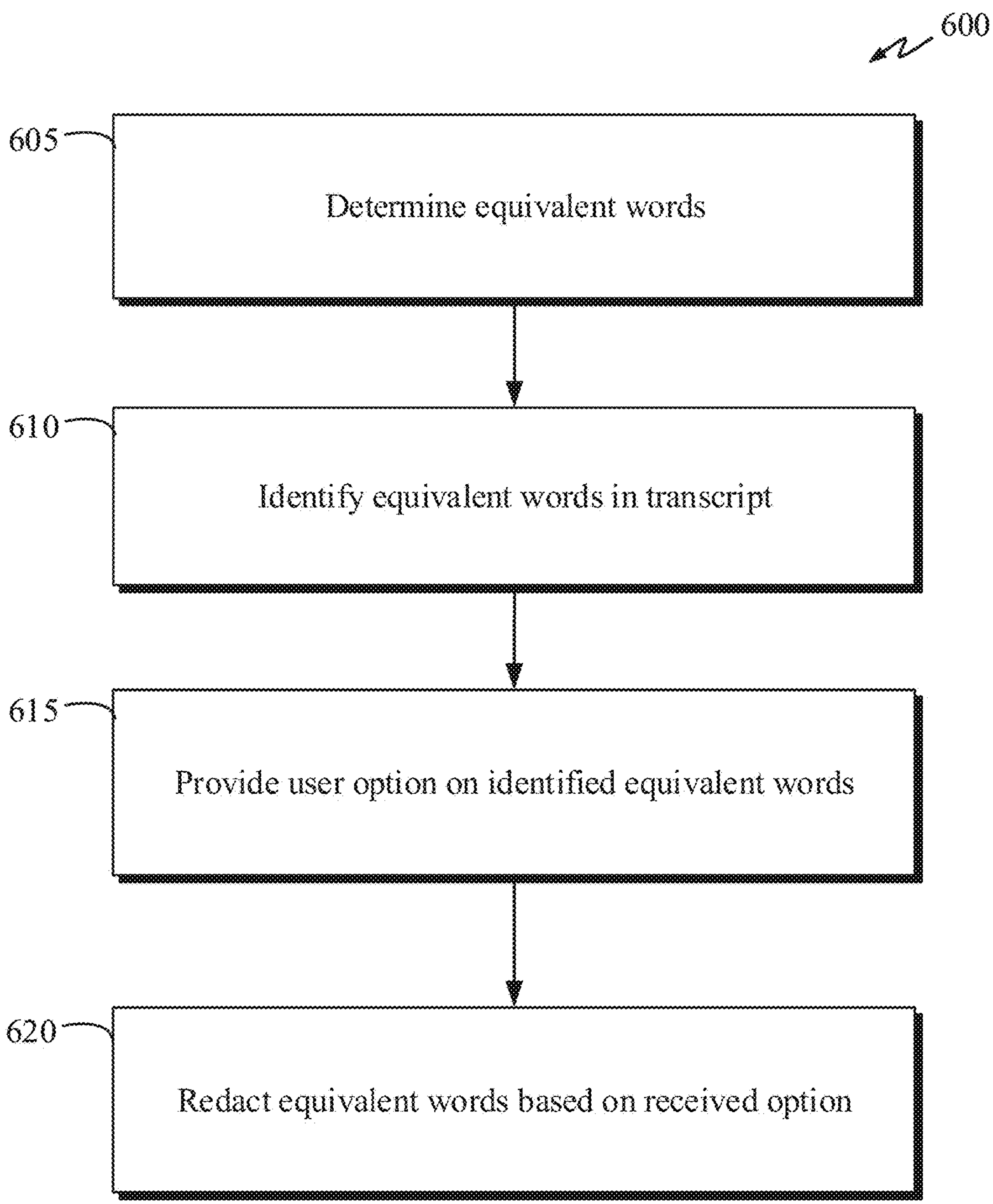

FIG. 6 is a block diagram of a redaction method 600 for similar words in accordance to some embodiments of the present disclosure. A 605, for each candidate word, system 100 (or a redaction module) can determine one or more words that are similar, synonyms, or have the same meaning as the candidate words. For example, if the candidate word is Bob, then system 100 can look up Bob on a word-equivalent database (see item 815 of FIG. 8) to determine a plurality of names that are similar or equivalent to Bob that should also be candidates for redaction. In this example, words or names that are equivalent to Bob can be: Bobby, Bobbie, Rob, Robbie, and Robison. In another example, given a candidate word "marijuana", the equivalent word can be: joint, weed, grass, and gummy bear. Although these equivalent words were not expressly selected for redaction, it may be necessary to redact them to prevent the inadvertent omission of confidential and/or privileged communications.

In some embodiments, equivalent phrases of candidate phrases can also be identified. For example, given a candidate phrase "I want a hit," system 100 can use the word-equivalent database to determine similar/equivalent phrases that should also be redacted. In this way, the redaction process can be over inclusive to ensure that another equivalent phrase such as "I want a joint" is not included in the redacted version of the media. In this example, the equivalent phrase for "I want a hit," can be: "I need to get high"; "I want some weed"; "give me a hit"; "let's light up some grass." Each of these equivalent phrases (and words) can be assigned a similarity score, which range from somewhat similar to identical. Accordingly, each word and phrase in the equivalent database has an inclusivity-sensitivity score that corresponds to one or more word and/or phrases. In some embodiments, the user can adjust an inclusivity-sensitivity factor of the redaction process. For example, a low inclusivity-sensitivity factor will cause system 100 to only include equivalent word/phrases having very high or identical similarity score. A high inclusivity-sensitivity factor will cause system 100 to include equivalent word/phrase with a low similarity score. Thus, depending on the sensitivity of the content of the media and the consequences of inclusion, the inclusivity-sensitivity factor can be adjusted to meet the circumstances of the case.

The inclusivity-sensitivity factor as disclosed herein, among other things disclosed, allows the redaction process to be automated with confidence and with high accuracy. Otherwise, using convention redaction techniques, achieving an automated redaction process to have the same level of accuracy and confidence as system 100 would have extremely difficult (if not impossible).

In some embodiments, system 100 can determine equivalent words and/or phrases for a candidate word and/or phrase using linguistic trends according to a region, a culture, a dialect, and the time when the candidate word and/or phrase was used. For example, the candidate word "money" can have a different set of equivalent words based on the region, culture, dialect, and/or time when the candidate word money was used. To illustrate, an equivalent word "dinero" may be prevalent in the West Coast of the United States, but not in the East Coast. In another example, an equivalent word "bones" for money may be specific to the locality where the media was created (the media from which the transcription came). Accordingly, system 100 can determine the origin information (e.g., locality, time, region, dialect) of the media in order to determine equivalent words and/or phrases that are prevalent to the origin information. In some embodiments, the origin information may be determined based on the subjects (speakers) in the media. For example, the subject may have a certain accent or known to speak a certain dialect. In some embodiments, system 100 can solicit the user for the origin information.

At 610, each of the determined equivalent word/phrase is located within the transcript and flagged as an equivalent word to one of the candidate words. In some embodiments, equivalent words/phrases are displayed in display area 210 differently from regular text and/or candidate words to highlight the fact that they are equivalent words. For example, words in the transcript that are equivalent words can have a different font and/or color.

In some embodiments, a listing of equivalent words for each candidate word is provided to the user. The listing of equivalent words can be displayed on the client device, which is configured to allow the user to interact with the listing and to reject and/or approve any of the suggested equivalent words for redaction (at 615). For example, given a user selected candidate name/word "Bob", the listing of equivalent name may include Bobby, Bobbie, Robert, Rob, and Robertson. In this example, the user may select Robertson from the list of equivalent words and disapprove it for redaction. The user can also approve the names Bobby, Robert, and Rob for automatic redaction. In some embodiments, at 620 any words not deleted or disapproved from the list of equivalent words will be automatically redacted.

Figure 7:
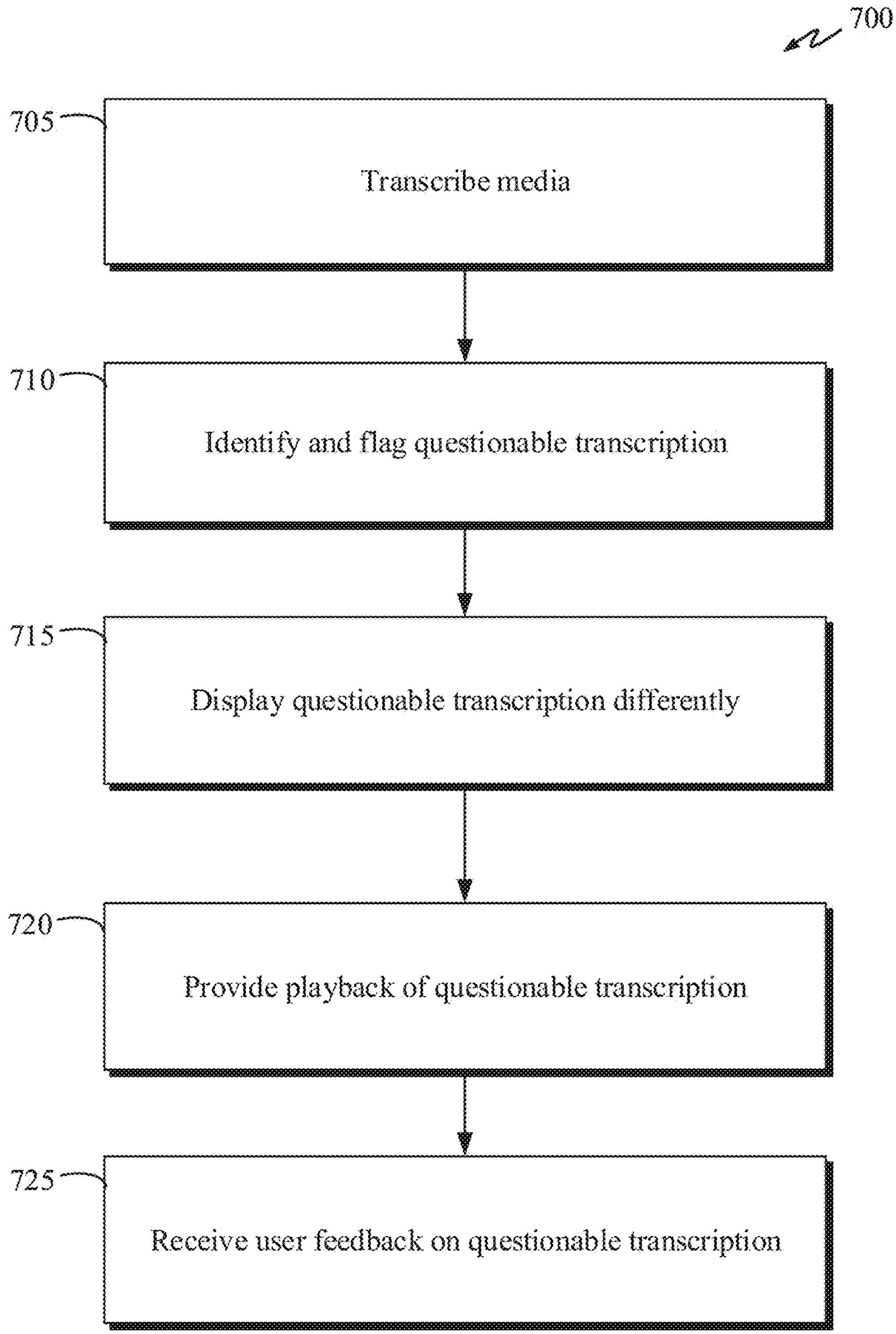

FIG. 7 is a block diagram of a transcription method 700 in accordance with some embodiments of the present disclosure. Method 700 starts at 705 where a media is transcribed. Certain words in the media may be hard to transcribe accurately due to a variety of factors including quality of the media, tone and inflection used by the speaker, volume of the speaker, accent, etc. At 710, the transcription module may flag words that are questionable and/or inaudible due to any of the above issues (or other non-specified issues). Words that are flagged as questionable may be later reviewed.

In some embodiments, the transcription module and the correlation module store transcription metadata relating to any transcribed word in a transcript metadata file. Transcription metadata can include, but not limited to: questionable transcription flag; start and stop locations in the media; listing of equivalent words/phrases, actor (speaker of the word), receiver, tone, dialect, and redaction information.

At 715, the transcript and the transcript metadata file produced by the transcription module are sent to the client device, which may display portion of the transcript to the user on a user interface. In some embodiments, any words in the transcript that are flagged as questionable are displayed differently from normal transcribed words and equivalent words to bring attention to the questionable transcription. For example, normal, equivalent, and questionable transcribed words can be shown in black, yellow, and red, respectively.

At 720, the client device is configured to allow the user to interact with the flagged questionable transcribed word, which can cause the client device to immediate playback the portion in the media where the questionable transcribed word is located. In this way, the user can listen and/or watch to the questionable portion and edit the questionable transcribed word if necessary (at 725). The user can also unflag the questionable transcribed word and return it to a normal status.

It is understood that the order of execution of processes 400, 500, 600, and 700 can be varied without departing from the scope of the invention. For example, within process 600, sub-process 615 may be performed before sub-process 610.

Figure 8:
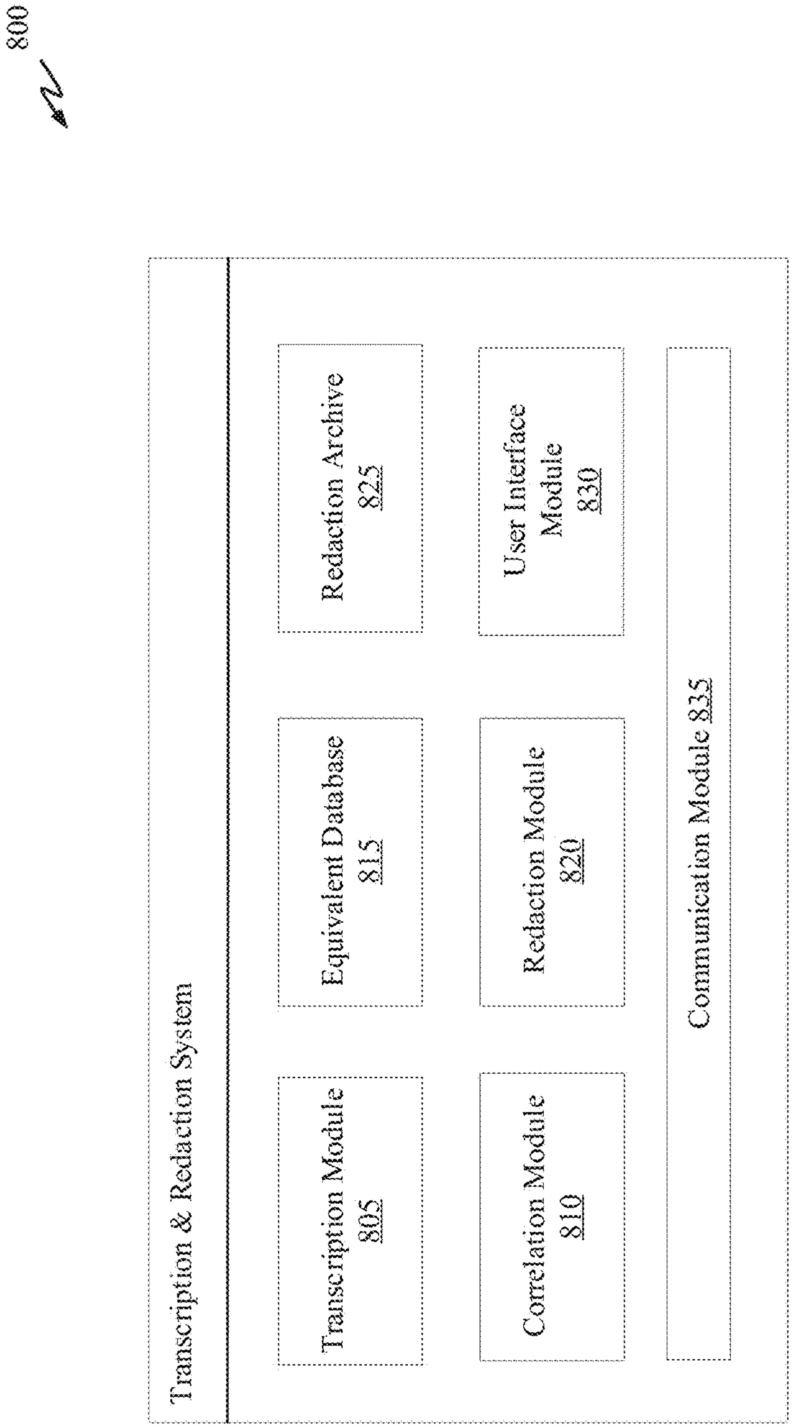
FIG. 8 is a block diagram of an exemplary transcription and redaction system in accordance with some embodiments of the disclosure.

FIG. 8 illustrates a system diagram of a transcription and redaction system 800 in accordance with some embodiments of the disclosure. System 800 may include a transcription module 805, a correlation module 810, an equivalent database 815, a redaction module 820, a redaction archive 825, a user interface module 830, and a communication module 835. System 1000 may reside on a single server or may be distributedly located. For example, one or more system components (e.g., modules 805, 810, and 815) of system 800 may be distributedly located at various locations throughout a network. For example, one or more portions of transcription module 805 and correlation module 1010 may reside either on the client side or the server side. Each component or module of system 800 may communicate with each other and with external entities via communication module 830. Each component or module of system 800 may include its own sub-communication module to further facilitate with intra and/or inter-system communication.

Transcription module 805 contains codes, instructions, and algorithms which when executed by a processor will cause the processor to perform one or more processes and/or sub-processes as described in at least methods 400 and 700. For example, transcription module 805 can transcribe a media and generate a transcript for the media. Transcription module 805 can also flag any questionable/inaudible dialog for later review and update the transcription metadata file as necessary.

Correlation module 810 contains codes, instructions, and algorithms which when executed by a processor will cause the processor to perform one or more processes as described in at least methods 400 and 600. One of the main functions of correlation module 810 is to correlate each word in the transcript to a start and stop locations in the media. This correlation information can be stored in a correlation database and/or in the transcript metadata file. Correlation module 810 can also identify equivalent words and/or phrases of a candidate word/phrase. It should be note that the identification of equivalent words and/or phrases can also be done by transcription module 805 or the redaction module 820. The functionalities of each module (e.g, 805, 810, and 820) can be shared and/or overlapped without departing from the scope of the present disclosure.

Equivalent database 815 is a repository of words and phrases having equivalent/similar meaning. In some embodiments, equivalent database 815 can generate a list of equivalent words/phrases for a given input. For example, equivalent database 815 can receive the word "money" as an input, and in response to the input, equivalent database can generate a list of words that are equivalent to the word "money." In this example, the list of words can include cash, clams, bacons, benjamins, dinero, dough, moola, etc.

Equivalent database may reside on the server or on the client device. Once an equivalent word is accepted by the user for redaction, the equivalent word along with its identifying information can be added to the transcript metadata file or to redaction archive 825. The identifying information can be name of the media file, the corresponding candidate word, the start and stop locations within the media, redaction session name and date, etc.

In some embodiments, equivalent database 815 can include origin information for each word and/or phrase in the database. Origin information can include the time and region where the media is created; the speaker's dialect, ethnicity, education, culture, and fluency in other languages; and current linguistic trends. In some embodiments, origin information can be manually entered by the user of system 100.

Redaction module 820 contains codes, instructions, and algorithms which when executed by a processor will cause the processor to perform one or more processes as described in at least methods 400 and 600. Redaction module 820 is configured to redact, replace, erase, and/or edit one or more portions of the media containing words/text that matches with the user entered/selected candidate words (and/or phrases) and identified equivalent words (and/or phrases). Redaction module 820, working in conjunction with the client device, can also display a time bar for the media on the client device. The redaction module can also provide visually indications on the time bar portions of the media that have been redacted.

Redaction archive 825 can contain name of redaction session, date, time, user identification, candidate words, equivalent words, etc. Redaction archive 825 can also contain unredacted portions of the media that have been redacted. Each unredacted portion is stored along with its identifying information so it could be retrieved and restored. In some embodiment, redaction module 820 automatically archives the portion of the media that will be redacted. In this way, the redacted portion may be restored. An archived redaction procedure can be recalled for edit, deletion, or cancellation. For example, the user may redact all portions of the media where "Jane Doe" is mentioned. As mentioned, circumstances may change and the statements (information) made with respect to or in reference to Jane Doe may no longer be privileged. Accordingly, archive database 825 provides a way for the user to retrieve archived redaction procedures for edit and/or restoration of the redacted portion. In this way, the user may recall all of the redactions made with respect to Jane Doe.

User interface module 830 contain codes, instructions, and algorithms which when executed by a processor will cause the processor to generate user interfaces 200 and 300 (as described in FIGS. 2 and 3). User interface module 830 can also include codes, instructions, and algorithms to perform one or more processes and/or sub-processes described in methods 400, 500, 600, and 700.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

It should be noted that transcription and redaction system 800 can be implemented as software instructions stored in one or more non-transitory memories that, when executed by processing circuitry, cause the processing circuitry to take certain actions. The processing circuitry can include one or more processors in a common location or distributed across multiple devices. In some embodiments system 800 is stored and executed on a computer system that is local to a user, such as a workstation or personal computer, while in other embodiments system 800 is stored and executed on a database and/or web server remote to the user (e.g., on the cloud), for example as a web-accessible software program accessed remotely by the user through an internet connected computing device.

Figure 9:
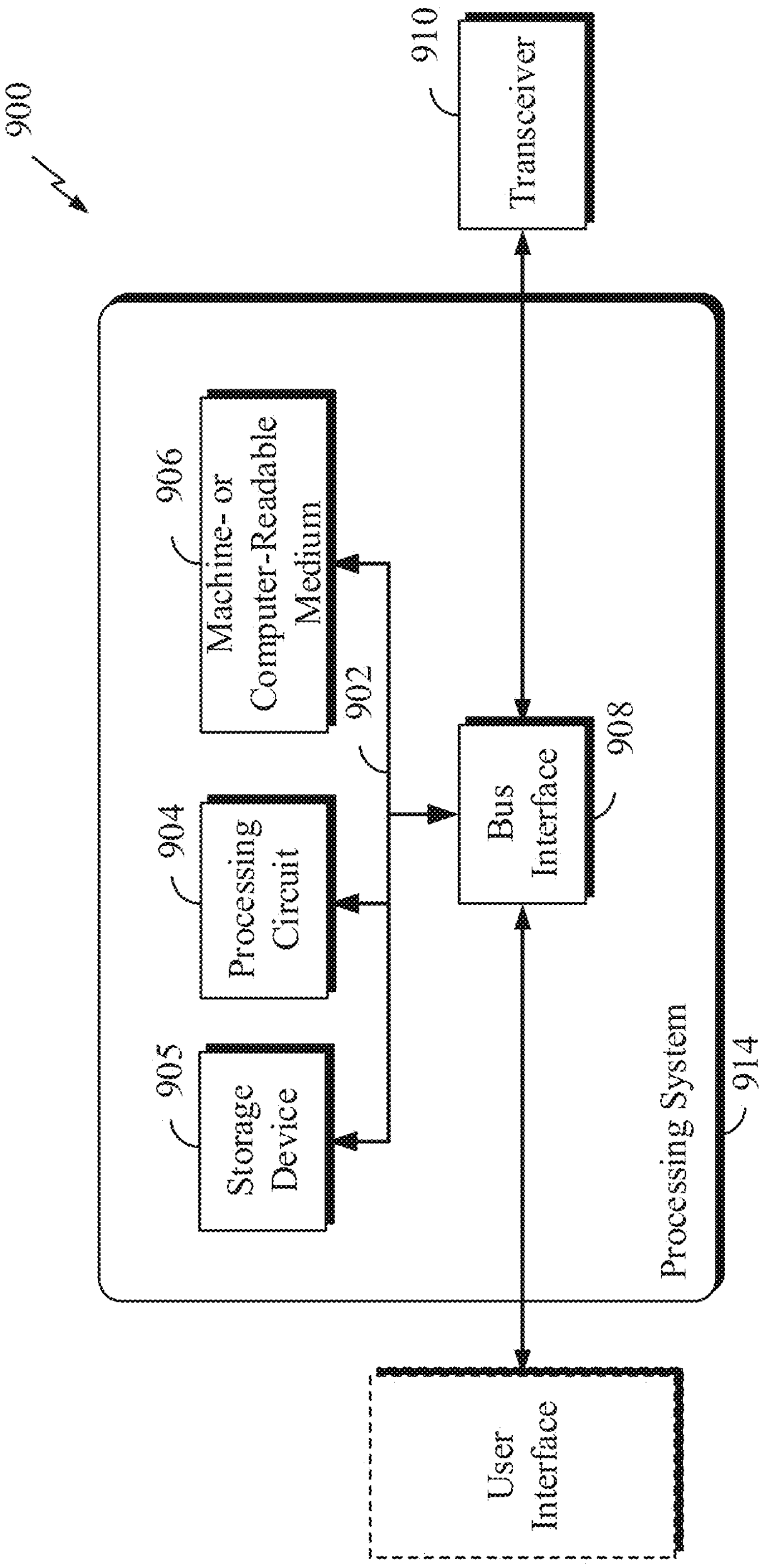
FIG. 9 is a block diagram illustrating an example of a hardware implementation for an apparatus employing a processing system that may exploit the systems and methods of FIGS. 2-7 in accordance with some embodiments of the disclosure.

FIG. 9 illustrates an overall system or apparatus 900 in which methods/processes 400, 500, 600, and 700 may be implemented and user interfaces 200 and 300 may be generated. In accordance with various aspects of the disclosure, an element, or any portion of an element, or any combination of elements may be implemented with a processing system 914 that includes one or more processing circuits 904. Processing circuits 904 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 904 may be used to implement any one or more of the processes described above and illustrated in FIGS. 4 through 7.

In the example of FIG. 9, the processing system 914 may be implemented with a bus architecture, represented generally by the bus 902. The bus 902 may include any number of interconnecting buses and bridges depending on the specific application of the processing system 914 and the overall design constraints. The bus 902 links various circuits including one or more processing circuits (represented generally by the processing circuit 904), the storage device 905, and a machine-readable, processor-readable, processing circuit-readable or computer-readable media (represented generally by a non-transitory machine-readable medium 908.) The bus 902 may also link various other circuits such as timing sources, peripherals, voltage regulators, and power management circuits, which are well known in the art, and therefore, will not be described any further. The bus interface 908 provides an interface between bus 902 and a transceiver 99. The transceiver 99 provides a means for communicating with various other apparatus over a transmission medium. Depending upon the nature of the apparatus, a user interface 912 (e.g., keypad, display, speaker, microphone, touchscreen, motion sensor) may also be provided.

The processing circuit 904 is responsible for managing the bus 902 and for general processing, including the execution of software stored on the machine-readable medium 908. The software, when executed by processing circuit 904, causes processing system 914 to perform the various functions described herein for any particular apparatus. Machine-readable medium 908 may also be used for storing data that is manipulated by processing circuit 904 when executing software.

One or more processing circuits 904 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 908. The machine-readable medium 908 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 908 may reside in the processing system 914, external to the processing system 914, or distributed across multiple entities including the processing system 914. The machine-readable medium 908 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The invention claimed is:

1. A method for redacting content from a media, comprising:

receiving a media;

transcribing the media to create a transcript;

correlating a plurality of transcribed words of the transcript to a start and end points on the media;

sending the transcript to a client device for display on a user interface of the client device;

receiving, from the client device, a selection of a group of words of the transcript for redaction;

archiving one or more portions of the media containing the selected group of words using the correlated start and end points for each word in the group of words in order to reverse the redaction when required;

determining an inclusivity-sensitivity factor;

receiving an adjustment to the inclusivity-sensitivity factor;

adjusting the inclusivity-sensitivity factor;

determining one or more similar phrases that have similar meaning to the selected group of words using linguistic trends according to at least one of region, culture, dialect and time, and based on the adjusted inclusivity-sensitivity factor;

identifying each occurrence of the determined one or more similar phrases;

redacting the one or more portions of the media containing the one or more similar phrases using the correlated start and end points of the similar phrases, wherein redacting comprises editing the media to delete or replace the one or more portions of the media; and generating a redacted media from the received media.

2. The method of claim 1, wherein correlating comprises identifying the start and end points of each text of the transcript.

3. The method of claim 1, further comprises:

sending the determined one or more similar phrases to the client device for display;

receiving, from the client device, a selection of one or more similar phrases to include in the redaction; and redacting one or more portions of the media based on the received selection of one or more similar phrases.

4. The method of claim 1, wherein redacting comprises replacing the one or more redacted portions with a blank content or a message to indicate that the one or more portions have been redacted.

5. The method of claim 1, wherein the media is one of an audio file, a video file, and a multimedia file.

6. A method for redacting media content, comprising:

transcribing at a server one or more media files to create one or more transcripts;

determining a start and end points in the one or more media files for a plurality of words in the one or more transcripts;

receiving one or more candidate words to be redacted;

archiving one or more portions of the media files where the plurality of words in the one or more portions match with the received one or more candidate words in order to reverse a redaction of the one or more portions when required;

determining an inclusivity-sensitivity factor;

receiving an adjustment to the inclusivity-sensitivity factor;

adjusting the inclusivity-sensitivity factor;

determining one or more similar phrases that have similar meaning to the received one or more candidate words based on the adjusted inclusivity-sensitivity factor;

identifying each occurrence of the determined one or more similar phrases using linguistic trends according to at least one of region, culture, dialect and time; and redacting the one or more portions containing the one or more similar phrases from the one or more media files.

7. The method of claim 6, further comprises:

receiving the one or more media files at the server;

sending the one or more transcripts to a client device for display;

displaying a portion of the one or more transcripts on the client device;

enabling a user to select, on a user interface of the client device, the plurality of words of the displayed portion of the one or more transcript; and receiving, at the server, the highlighted plurality of words from the client device.

8. The method of claim 7, further comprises:

displaying on the user interface of the client device one or more time bars for the one or more media files; and visually indicating on the displayed one or more time bars one or more redacted portions of the one or more media files.

9. A non-transitory processor-readable medium having one or more instructions operational on a computing device, which when executed by a processor cause the processor to:

transcribe, at the server, one or more media files to create one or more transcripts;

determine a start and end points in the one or more media files for one or more words in the one or more transcripts;

receive one or more candidate words to be redacted from a client device;

archive one or more portions of the media files where the one or more words in the one or more portions match with the received one or more candidate words in order to reverse a redaction of the one or more portions when required;

determine an inclusivity-sensitivity factor;

receive an adjustment to the inclusivity-sensitivity factor;

adjust the inclusivity-sensitivity factor;

determine one or more similar phrases that have similar meaning to the received one or more candidate words using linguistic trends according to at least one of region, culture, dialect and time, and based on the adjusted inclusivity-sensitivity factor;

identify each occurrence of the determined one or more similar phrases; and redact the one or more portions containing the one or more similar phrases from the one or more media files using the determined start and end points for the one or more words in the one or more transcripts.

10. The non-transitory processor-readable medium of claim 9, further comprises instructions which when executed by a processor cause the processor to:

receive the one or more media files at the server;

send the one or more transcripts to a client device for display;

receiving, at the server, one or more redaction-candidate words from the client device.

11. A system having one or more processors and one or more memories storing instructions that correspond to one or more modules executed by the one or more processors for redacting media content, comprising:

a transcription module configured to:

receive the media content;

transcribe the media content to create a transcript;

a correlation module configured to correlate one or more words in the transcript to a start and end points in the media content; and a redaction module configured to:

receive one or more candidate words to be redacted;

determine an inclusivity-sensitivity factor;

receive an adjustment to the inclusivity-sensitivity factor;

adjust the inclusivity-sensitivity factor;

match the received one or more candidate words, using linguistic trends according to at least one of region, culture, dialect and time and based on the adjusted inclusivity-sensitivity factor, to one or more similar phrases that have similar meaning to the received one or more candidate words in the transcript and identify start and end points in the media;

archive one or more portions of the media files where the one or more similar phrases in the one or more portions match with the received one or more candidate words in order to reverse a redaction of the one or more portions when required; and redact the one or more portions from the media content using the identified start and end points.

12. The system of claim 11, further comprises a client device configure to:

receive and display a portion of the transcript;

enable a user to select one or more candidate words from the displayed portion; and send the selected one or more candidate words to the redaction module.

13. The system of claim 12, wherein the client device is further configured to:

display a time bar representing a duration of the media content; and visually indicate on the displayed time bar one or more redacted portions of the media content.

* * * * *